Patented Sept. 14, 1948

2,449,447

UNITED STATES PATENT OFFICE 2,449,447

PREPARATION OF ETHER ESTERS

Richard E. Brooks, Wilmington, Del., assignor to E. I. du Pont de Nemours & Company, Wilmington, Del., a corporation of Delaware No Drawing. Application September 13, 1946, Serial No. 696,935

4 Claims. (Cl. 260—484)

This invention relates to a process for the preparation of aliphatic organic esters and more particularly to the preparation of alkoxy-substituted carboxylic acid esters from ketenes and alkoxy-substituted alkanes.

An object of the present invention is to provide a process for the preparation of new compositions of matter. A further object is to provide new compositions of matter having the generic formula

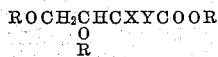

in which R is a hydrocarbon group and X and Y are hydrogen or hydrocarbon groups. A further object is to provide a process for the interaction of a ketene with 1,1,2-trialkoxyethane whereby a 3,4-dialkoxybutyric acid ester is produced. Other objects and advantages of the invention will hereinafter appear.

The above and other objects are realized by the reaction of ketene with a 1,1,2-trialkoxyalkane, the reaction being conducted preferably in the presence of an acid catalyst. The reaction takes place spontaneously by the introduction of the ketene into an acidified 1,1,2-trialkoxyalkane and as a consequence it is usually desirable to provide cooling means to maintain the desired temperature. The reaction may be carried out by first acidifying the 1,1,2-trialkoxyalkane with one of the catalysts hereinafter specified or an equivalent thereof and then bubbling the ketene into the acidified mixture, the reaction preferably being conducted in the absence of water.

Generically the reaction may be illustrated by the equation (1)

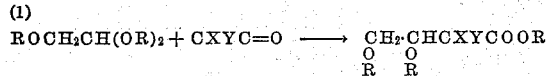

wherein R is an alkyl group, such as methyl, ethyl, n- and isopropyl, n- and iso- butyl or a higher alkyl group; an aryl group, such as phenyl, tolyl, etc., or a substituted alkyl or aryl group such as carbomethoxymethyl, etc.; and X and Y may be hydrogen, alkyl or aryl groups that are similar or dissimilar to the members of the R group. By substituting in the R position only, it will be noted that the formula designates the reaction of 1,1,2-trialkoxy or aryloxy alkanes with a ketene to produce alkoxy-substituted carboxylic acid esters.

More specifically, the process of the instant case is illustrated by the equation:

(2)

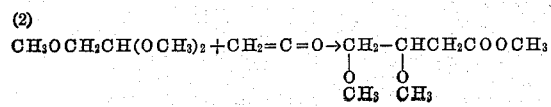

wherein 1,1,2-trimethoxyethane reacts with ketene to form methyl 3,4-dimethoxybutyrate.

The reaction is preferably conducted at a relatively low temperature. The temperature, however, may range between —80 to +100° C. with a preferred range between —10 and +10° C., the temperature of the reaction inter alia depending on the nature and activity of the acid catalyst employed. The 1,1,2-trialkoxyalkane, after addition of the catalyst, is cooled to the desired temperature of the reaction, ketene vapors introduced into the mixture by bubbling, diffusion or by other suitable means until no further ketene is absorbed.

The catalyst used in the reaction may be any suitable acid catalyst such as sulfuric acid, phosphoric acid, benzene sulfonic acid, zinc chloride, ferric chloride, aluminum chloride, boron trifluoride and its addition products with ethers, esters, and the like, Friedel-Crafts type catalysts or combinations of these acid catalysts. The catalyst should be present in amounts ranging between 0.2 to 100% based on the weight of the 1,1,2-trialkoxyalkane present, the proportion of the catalyst present being determined inter alia on its activity and the temperature level at which the reaction is to be conducted.

The ketenes that may be used include the aldoketenes having the formula RCH:CO in which R is hydrogen or alkyl or aryl and the keto-ketenes having the formula $R_2C:CO$ in which R is an alkyl group such as methyl, ethyl, or propyl, or an aryl group such as phenyl or tolyl.

The alkoxy-substituted alkanes that may be reacted with the aforesaid ketenes include the 1,1,2-trialkoxyalkanes in which the alkyl group may be similar to those designated above under a discussion of Equation 1. These compounds can be prepared in accord with the process of P. P. Shoruigin et al. described in their article on "Ethers of Hydroxy Aldehydes and their Acetals," C. A. 29-7941₆ (1935), the process of M. H. Palomaa et al. described in their article on "Synthesis of Ether Acetals with their Halo Ethers," C. A. 33-8566₂ (1939); Br. 72B 317, or by the process described in the copending application of W. F. Gresham—S. N. 680,072—filed June 28, 1946, which covers the synthesis of 1,1,2-trialkoxyethanes by the simultaneous reaction of dialkyl formals, carbon monoxide and hydrogen in the presence of an alkanol and a nickel-containing or cobalt-containing catalyst. The reaction is conducted at a temperature between 100° and 350° C. and under pressures between 400 and 1000 atmospheres, the initial mol ratio of carbon monoxide to hydrogen being within the range of 3:1 to 1:3.

The reaction may be conducted in the presence or absence of any suitable solvent that is inert to the reactants. The alicyclic ethers are especially well adapted for this purpose such, for example, as dimethyl, diethyl, methyl ethyl, and the higher symmetrical and unsymmetrical ethers of the class.

The esters are recovered from the reaction mixture after first neutralizing the acid present by addition of a suitable alkali such as an alkali metal alcoholate, sodium methoxide, sodium ethoxide, sodium carbonate, anhydrous ammonia, and the like, the addition being continued until the mixture is neutral to litmus. Any precipitated catalyst salt is filtered off and the filtrate subjected to distillation for the recovery of the ester.

The examples illustrate preferred embodiments of the invention in which parts are by weight unless otherwise indicated.

*Example 1.*—Ketene vapors (ca. 1 mol) were passed during 5.6 hours through a stirred solution of 44.0 g. of 1,1,2-trimethoxyethane, $CH_3OCH_2CH(OCH_3)_2$, 6 cc. of an equimolar $BF_3$-dimethyl ether complex, and 150 cc. of anhydrous ether. The solution, which was maintained at 1-2° C. by external cooling, gradually darkened to a brown color. The product was made basic to wet litmus paper by the addition of methanolic sodium methylate and distilled at reduced pressure. The conversion of the trimethoxyethane to a (5° boiling range) methyl 3,4-dimethoxybutyrate fraction was 89% (52.8 g.). Pure methyl, 3,4-dimethoxybutyrate boils at 55° C./3.5 mm. or 73.8°/8 mm. and has a refractive index ($N_D^{25°}$) of 1.4155. It is soluble in water and the common organic solvents. Its identity was confirmed by saponification number (347.7, 346.5, and 348.6 vs. 346.5 theoretical) and methoxyl determination after saponification (methoxyl content 37.4%, 36.9% vs. 38.3% theoretical).

*Example 2.*—In a similar experiment ketene vapors (ca. 0.5 mol. from the pyrolysis of acetone) were bubbled through a stirred solution of 300 cc. anhydrous ether, 10 cc. (11.1 g.) $BF_3$-diethyl ether complex (1:1), and 108.8 g. 1,1,2-trimethoxyethane (refractive index at 25°=1.3905). The time required was 3.7 hours, and the temperature was maintained at 1-3° by external cooling. The product was worked up as in Example 1, giving a conversion of 44.3% (based on charged trimethoxyethane) and a yield of 84.7% (based on unrecovered trimethoxyethane).

*Example 3.*—Ketene vapors were bubbled for six hours through a mixture of 48.2 g. 1,1,2-trimethoxyethane and 1.0 cc. of $BF_3$-dimethyl ether complex (1:1) with stirring at 0° C. The product was worked up as in Example 1, giving a conversion of trimethoxyethane to methyl 3,4-dimethoxybutyrate of 57-70%.

*Example 4.*—Ketene vapors (Ca. 1 mol) were passed during 4.7 hours through a mixture of 45.1 g. 1,1,2-trimethoxyethane and 1.3 g. anhydrous $BF_3$ (added at −80° C.), with stirring, at 0° C. The product, worked up as in Example 1, showed a conversion to methyl 3,4-dimethoxybutyrate of 53-72%.

*Example 5.*—Ketene (ca. 9 mol.) was bubbled during 4.2 hours through a mixture of 50.7 g. 1,1,2-trimethoxyethane and 1.4 g. anhydrous zinc chloride, with stirring, at 19-26° C. The product was worked up as Example 1, giving a conversion to crude methyl 3,4-dimethoxybutyrate of 41.6%, and a yield of 55.7%.

The examples illustrate a discontinuous in contrast to a continuous type of operation, but the reactants (one being a gas, the other a liquid) lend themselves to continuous operation. In such an operation, the ketene and the 1,1,2-trialkoxyethane can be passed into a tubular reaction zone together with the catalyst and the temperature of the reaction controlled within narrow limits by jacketing the converter. When so operating a solid acid catalyst may be used, supported or not, and the fluid reactants passed over or through it. By this method of operation and by careful adjustment of the rates of flow of ketene and alkane into the reaction zone, optimum conversions to the ester can be realized.

The alkoxy-substituted aliphatic organic acid esters of the invention are valuable solvents and plasticizers for use in the plastic arts as well as intermediates for the preparation of valuable organic compounds.

I claim:

1. A process for the preparation of an ester of a 3,4-dialkoxybutyric acid which comprises passing ketene into a 1,1,2-trialkoxyethane having no ketene reacting substituent containing an acid catalyst whereby an ester of a 3,4-dialkoxybutyric acid is formed, the 1,1,2-trialkoxyethane having the structural formula:

$$ROCH_2CH(OR)_2$$

in which R designates similar alkyl groups.

2. A process for the preparation of methyl 3,4-dimethoxybutyrate which comprises passing ketene into 1,1,2-trimethoxyethane containing an acid catalyst, the reaction being conducted at a temperature between −80 and +100° C.

3. A process for the preparation of an ester of a 3,4-dialkoxybutyric acid which comprises passing ketene into a solution of 1,1,2-trialkoxyethane having no ketene reacting substituent and an acid catalyst in a solvent inert to the reactants, the 1,1,2-trialkoxyethane having the structural formula: $ROCH_2CH(OR)_2$ in which R designates similar alkyl groups.

4. A process for the preparation of methyl 3,4-dimethoxybutyrate which comprises cooling a mixture containing 1,1,2-trimethoxyethane and an acid catalyst to a temperature of about 0° C., introducing ketene into the cooled mixture, maintaining the temperature during the addition at about 0° C., and thereafter recovering the methyl 3,4-methoxybutyrate from the reaction mixture.

RICHARD E. BROOKS.

REFERENCES CITED

The following references are of record in the file of this patent:

UNITED STATES PATENTS

| Number | Name | Date |
| --- | --- | --- |
| 2,030,835 | Cox et al. | Feb. 11, 1936 |
| 2,316,465 | Staudinger et al. | Apr. 13, 1943 |
| 2,316,605 | Loder et al. | Apr. 13, 1943 |
| 2,366,738 | Loder et al. | Jan. 9, 1945 |

OTHER REFERENCES

Godman et al., "Jour. Chem. Soc.," London (1939), pages 1908 to 1914.

Baker, "Jour. Chem. Soc.," London (1942), page 521.